United States Patent
Kleitsch et al.

(10) Patent No.: US 10,030,675 B2
(45) Date of Patent: Jul. 24, 2018

(54) SYSTEM FOR STABILIZING PRESSURE FLUCTUATIONS IN A HYDRAULIC LINE OF A HYDRAULIC CIRCUIT

(71) Applicant: Caterpillar Inc., Peoria, IL (US)

(72) Inventors: Andrew Kleitsch, Shorewood, IL (US); John Cody Vacca, Joliet, IL (US)

(73) Assignee: Caterpillar Inc., Deerfield, IL (US)

(*) Notice: Subject to any disclaimer, the term of this patent is extended or adjusted under 35 U.S.C. 154(b) by 565 days.

(21) Appl. No.: 14/684,463

(22) Filed: Apr. 13, 2015

(65) Prior Publication Data

US 2016/0298657 A1   Oct. 13, 2016

(51) Int. Cl.
*F15B 1/02* (2006.01)

(52) U.S. Cl.
CPC .......... *F15B 1/021* (2013.01); *F15B 2201/20* (2013.01); *F15B 2201/4155* (2013.01); *F15B 2211/611* (2013.01); *F15B 2211/625* (2013.01)

(58) Field of Classification Search
CPC ......... F15B 1/021; F15B 2201/32; B60T 5/00
See application file for complete search history.

(56) References Cited

U.S. PATENT DOCUMENTS

| | | | |
|---|---|---|---|
| 2,974,683 A * | 3/1961 | Kahelin | F15B 1/24 138/31 |
| 4,083,469 A | 4/1978 | Schexnayder | |
| 4,461,322 A * | 7/1984 | Mills | F15B 1/24 138/31 |
| 4,651,781 A | 3/1987 | Kandelman | |
| 8,186,155 B2 * | 5/2012 | Rose | B60K 6/12 60/414 |
| 8,250,861 B2 * | 8/2012 | Schwark | B60K 6/12 60/414 |
| 8,458,904 B2 | 6/2013 | Zdroik et al. | |
| 8,534,061 B2 | 9/2013 | Fudouji | |
| 2013/0248303 A1 * | 9/2013 | Okuno | B60T 1/062 188/67 |

* cited by examiner

*Primary Examiner* — F. Daniel Lopez
(74) *Attorney, Agent, or Firm* — Leydig, Voit & Mayer, Ltd.

(57) ABSTRACT

A system for stabilizing pressure fluctuations in a hydraulic line of a hydraulic circuit includes a hydraulic vessel coupled to the hydraulic line; a separator element disposed within the vessel to define a first fluid chamber and a second fluid chamber within the vessel; and a relief valve disposed in communication with the second fluid chamber of the vessel. The vessel includes a first fluid receivable in the first fluid chamber from the hydraulic line and a second fluid that is disposed within the second fluid chamber. The separator element is moveable within the vessel in response to a volume change of the first fluid received from the hydraulic line. The relief valve is configured to selectively release the second fluid from the vessel in response to a pressure of the first fluid exceeding a pre-determined amount of pressure within the hydraulic vessel.

18 Claims, 8 Drawing Sheets

SYSTEM FOR STABILIZING PRESSURE FLUCTUATIONS IN A HYDRAULIC LINE OF A HYDRAULIC CIRCUIT

TECHNICAL FIELD

The present disclosure relates to a hydraulic system, and more particularly to a system for stabilizing pressure fluctuations or pressure spikes in a hydraulic line of a hydraulic circuit.

BACKGROUND

Typically, oil or other hydraulic fluid used to operate hydraulic systems, such as a truck bed hoist cylinder of a machine such as an off-road truck may also be used to cool the brakes of the machine. The oil may be circulated to one or more brake coolers by the main hydraulic pump except when the main hoist cylinder is activated to raise the truck payload bed. Upon demand, the oil flowing through the brake cooler may be redirected to the main hoist cylinder to raise the truck payload bed. This change in flow from the brake cooler to the main hoist cylinder and other changes in the flow path of oil or operation of the machine may cause a spike in fluid pressure, also known as a fluid hammer, in the brake cooler hydraulic circuit. This spike in fluid pressure may cause premature failure in seals of the brake cooler or related components.

WO 2013/112109 A1 (hereinafter referred to as the '109 publication) discloses an unloading valve that uses two pilot orifices to prevent spool oscillations due to sudden pressure fluctuations. However, previously known systems such as that disclosed in the '109 publication may not be configured to stabilize the pressure fluctuations occurring in the hydraulic line. Hence, there is a need for a system that stabilizes pressure fluctuations and prevent premature failure of seals and other related components in various types of hydraulic circuits.

SUMMARY

In one aspect of the present disclosure, a system for stabilizing pressure fluctuations in a hydraulic line of a hydraulic circuit includes a hydraulic vessel, a movable separator element, and a relief valve. The hydraulic vessel is coupled to the hydraulic line. The hydraulic vessel has a first end, a second end, and an inner cavity defined therebetween. The separator element is disposed within the inner cavity of the hydraulic vessel. The separator element defines a first fluid chamber that is disposed between the separator element and the first end. The separator element further defines a second fluid chamber that is disposed between the separator element and the second end.

The hydraulic vessel further includes a first fluid that is receivable in the first fluid chamber from the hydraulic line disposed proximal to the first end and a second fluid that is disposed within the second fluid chamber proximal to the second end. The separator element is moveable within the inner cavity of the vessel between the first and second ends in response to a volume change of the first fluid received from the hydraulic line.

The relief valve is disposed in fluid communication with the second fluid chamber of the hydraulic vessel. The relief valve is configured to selectively bleed off a pressure of the second fluid within the second fluid chamber of the vessel in response to a pressure of the first fluid exceeding a predetermined amount of pressure within the hydraulic vessel.

In another aspect of the present disclosure, a hydraulic system for stabilizing pressure fluctuations in a hydraulic line of a machine includes a hydraulic subsystem having a variable pressure to perform a hydraulic function, wherein the hydraulic subsystem includes a port. The hydraulic system further includes a hydraulic line coupled to the port, and a hydraulic vessel coupled to the hydraulic line. The hydraulic vessel has a first end, a second end, and an inner cavity defined therebetween. The hydraulic system further includes a movable separator element that is disposed within the inner cavity of the hydraulic vessel. The separator element defines a first fluid chamber disposed between the separator element and the first end. The separator element further defines a second fluid chamber that is disposed between the separator element and the second end.

The hydraulic vessel further includes a first fluid that is receivable in the first fluid chamber from the hydraulic line disposed proximal to the first end and a second fluid that is disposed within the second fluid chamber proximal to the second end. The separator element is moveable within the inner cavity of the vessel between the first and second ends in response to a volume change of the first fluid received from the hydraulic line.

The hydraulic system further includes a relief valve that is disposed in fluid communication with the second fluid chamber of the hydraulic vessel. The relief valve is configured to selectively bleed off a pressure of the second fluid within the second fluid chamber of the hydraulic vessel in response to a pressure of the first fluid exceeding a predetermined amount of pressure within the hydraulic vessel.

In yet another aspect of the present disclosure, a machine includes a hoist cylinder; a hoist control valve system coupled to the hoist cylinder; a wheel hub; a brake station positioned at the wheel hub; a brake cooling circuit coupled to the brake station; a hydraulic line connecting the hoist control valve system to the brake cooling circuit; and employing the system of the present disclosure for stabilizing pressure fluctuations in the hydraulic line.

Other features and aspects of this disclosure will be apparent from the following description and the accompanying drawings.

DETAILED DESCRIPTION

The present disclosure relates to a system for stabilizing pressure fluctuations in a hydraulic line of a hydraulic circuit. Wherever possible the same reference numbers will be used throughout the drawings to refer to same or like parts. Moreover, references to various elements described herein, are made collectively or individually when there may be more than one element of the same type. However, such references are rendered to merely aid the reader's understanding of the present disclosure and hence, to be considered exemplary in nature. Accordingly, it may be noted that any such reference to elements in the singular is also to be construed to relate to the plural and vice versa without limiting the scope of the disclosure to the exact number or type of such elements unless set forth explicitly in the appended claims.

Figure 1:
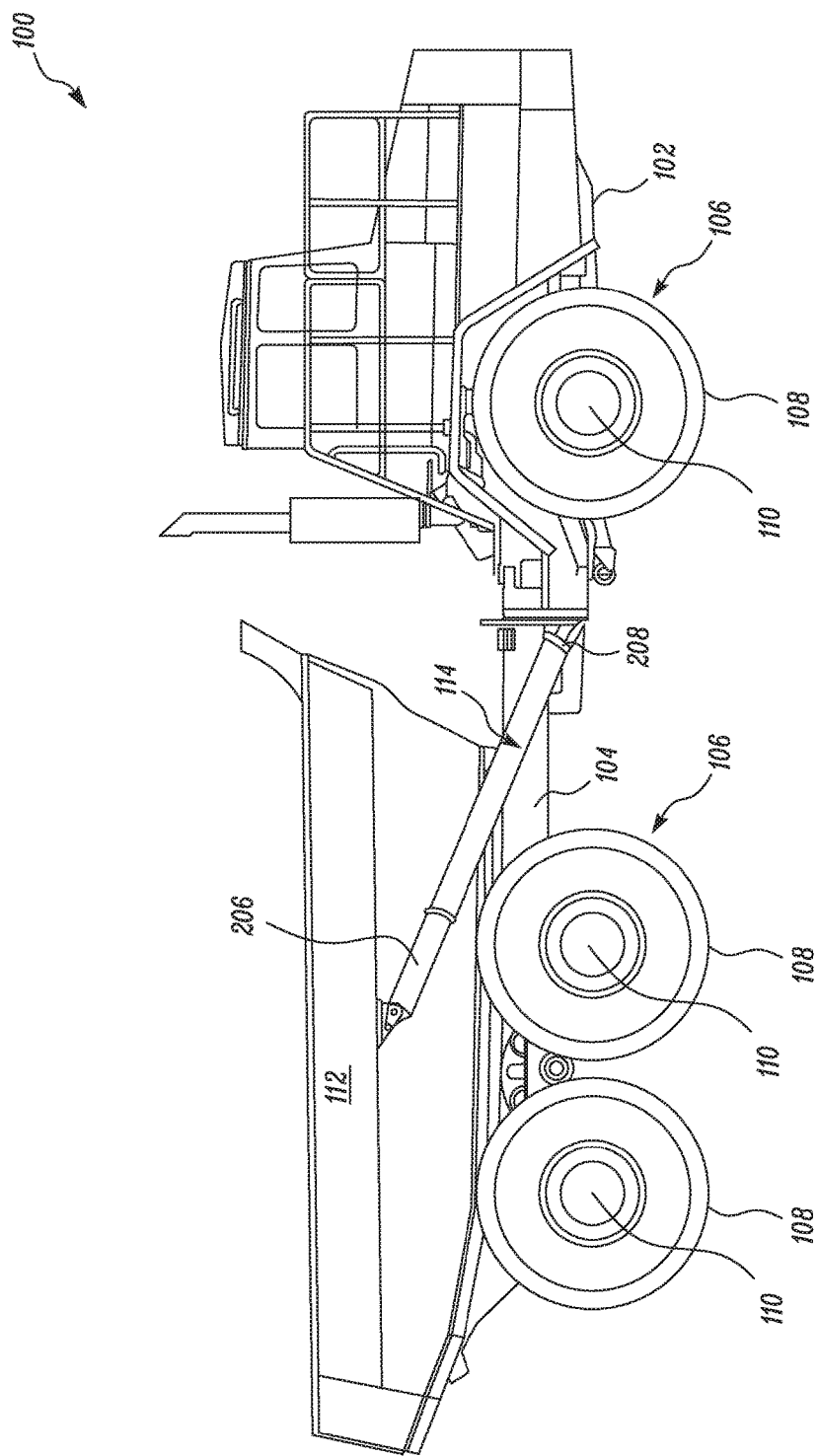
FIG. 1 is a perspective view of an exemplary machine embodied as a vehicle.

FIG. 1 illustrates an exemplary machine 100 that is embodied in the form of a wheeled vehicle, for e.g., a mining truck (as shown). The machine 100 may be used in a variety of applications including mining, road construction, construction site preparation, etc. For example, the mining truck of the present disclosure may be employed for hauling earth materials such as soil, debris, or other naturally occurring deposits from a worksite. Although a mining truck is depicted in FIG. 1, other types of mobile machines such as, but not limited to, large wheel loaders, off highway trucks, articulated trucks, on-highway trucks, or the like may be employed in lieu of the mining truck.

The machine 100 includes a prime mover 102, a frame 104, and multiple wheel assemblies 106. The prime mover 102 is mounted on the frame 104. The prime mover 102 may be a fuel-based engine to power the machine 100 by combustion of natural resources, such as gasoline, liquid natural gas, or other petroleum products. Moreover, the engine may be a petrol engine, a diesel engine, or any other kind of engine utilizing combustion of fuel for generation of power. However, in an alternative embodiment, the present disclosure may be equally implemented by way of using an electric motor in place of the engine as the prime mover 102. Therefore, any type of prime mover 102 commonly known in the art may be employed without deviating from the spirit of the present disclosure.

Each of the wheel assemblies 106 includes a wheel 108 mounted to a wheel hub 110. The wheel hub 110 is rotatably supported on the frame 104. Further, the machine 100 may also include a payload bed 112 and a hoist cylinder 114 that can be used to lift the payload bed 112 relative to the frame 104. In some applications, there may be more than one hoist cylinder 114 associated with the machine 100. More details about the machine 100 and in particular a hydraulic system 200 associated with the machine 100 are discussed in more detail below.

Figure 2:
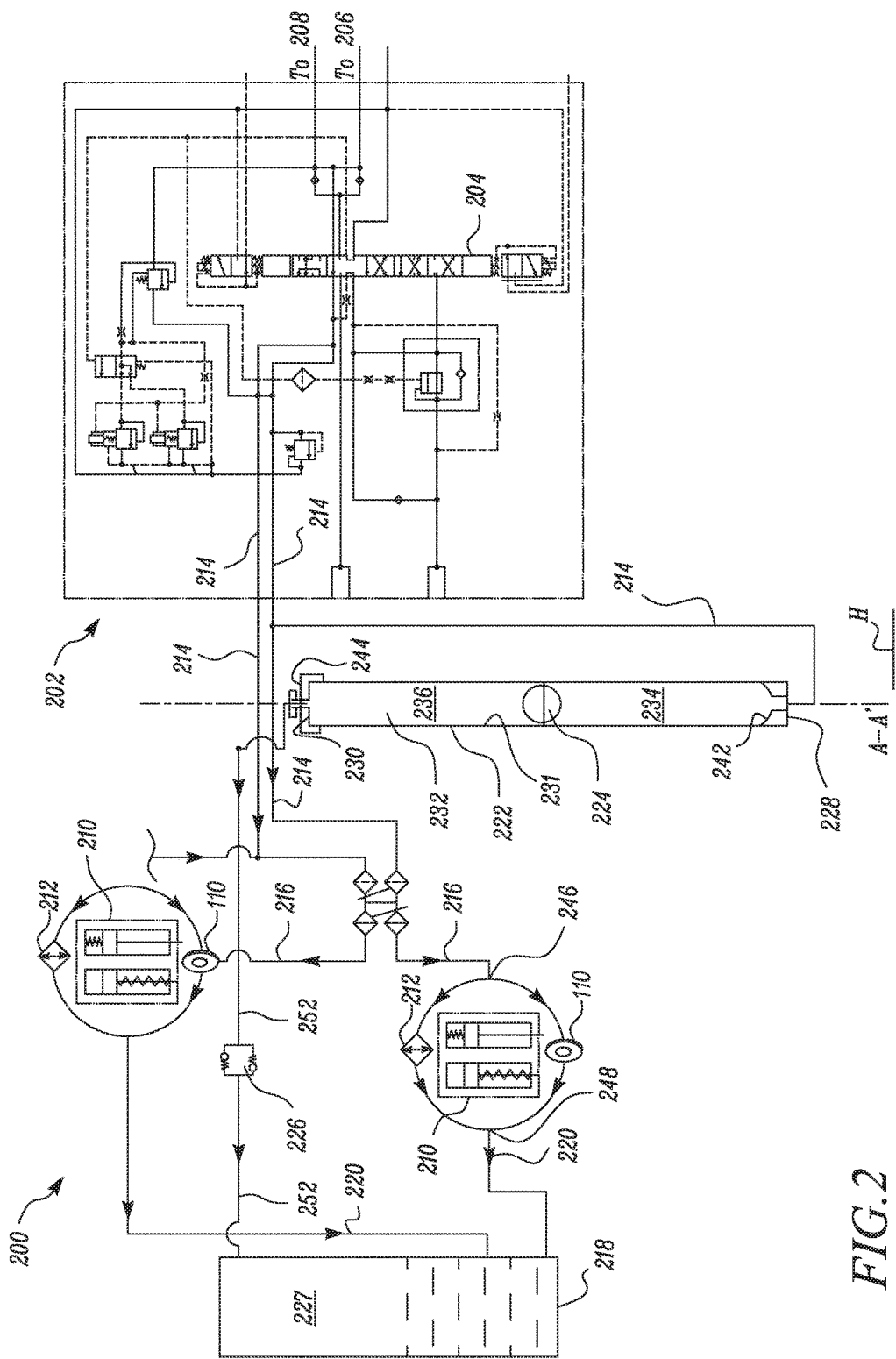
FIG. 2 is a diagrammatic representation of a hydraulic system that can be employed by the exemplary machine of FIG. 1.

FIG. 2 is a diagram of a hydraulic system 200 suitable for use in the machine 100. The illustrated hydraulic system 200 shows only component elements that are relevant to the current disclosure for the sake of simplicity and leaves out many elements commonly found in hydraulic systems of such machines including, but not limited to, additional pumps, safety relief valves, filters, counterbalance valves, additional cylinders, and auxiliary hydraulic units.

The hydraulic system 200 of FIG. 2 may include a hoist control valve system 202 fluidly coupled to the hoist cylinder 114 (shown in FIG. 1). The hoist control valve system 202 may include a hoist valve 204, also known as a hoist spool valve, to selectively direct pressurized flow from a pump (not shown) to perform hydraulic functions, such as selectively actuate movement of the hoist cylinder 114. The hoist cylinder 114 has a rod end 206 and a head end 208 (see FIG. 1), each capable of selectively receiving pressurized flow from the pump and providing fluid to tank 218 through the hoist valve 204 for operational movement of the hoist cylinder 114. The hoist valve 204 moves in a known fashion between positions to accommodate hydraulic connections between the elements of the hydraulic system 200. In an embodiment, the hoist valve 204 may include pilot pressure controls (not depicted) on each end of a spool that move the spool back and forth using pressurized fluid controlled by a joystick or other operator interface. In some embodiments, the spool may be moved by an electrohydraulic valve using electrical signals from a joystick control.

The machine 100 of FIG. 1 further includes a brake station 210 as shown schematically in FIG. 2. The brake station 210 is positioned at the wheel hub 110 (refer to FIG. 1) of the machine 100. Two brake stations 210 are depicted in the illustrated embodiment of FIG. 2 to correspond with a right wheel brake station and a left wheel brake station of the machine 100. However, any number of brake stations 210 may be present in a given machine 100 depending upon a type of the machine 100 and the number of wheels 108 included in a given type of machine.

Referring to FIG. 2, the hydraulic system 200 further includes a brake cooling circuit 212 coupled to each of the brake stations 210. In the illustrated embodiment of FIG. 2, one brake cooling circuit 212 is associated with one brake station 210. Moreover, as shown, the hydraulic system 200 includes a hydraulic line 214 fluidly connecting the hoist valve 204 to each of the brake cooling circuits 212. In the illustrated embodiment of FIG. 2, two hydraulic lines 214 are shown in which one hydraulic line 214 fluidly connects the hoist valve 204 with one of the two brake cooling circuits 212. However, in other embodiments, a single hydraulic line 214 could be optionally employed in lieu of the two hydraulic lines 214 without deviating from the scope of the present disclosure.

The hydraulic system 200 may also include a first port 246 at which the hydraulic line 214 from the hoist valve 204 fluidly connects to the brake cooling circuit 212. For the sake of simplicity, the hydraulic line 214 adjacent to the first port 246 will hereinafter be referred to as "the brake cooling line" and designated with the numeral "216". The hydraulic system 200 may further include a second port 248 which is configured to allow connection of the brake cooling circuit 212 to a tank 218.

In an embodiment, the pump may supply a first fluid i.e., hydraulic fluid or oil, to the brake cooling circuit 212 when the hoist cylinder 114 is not in use. When the pump is in use, for example, when the hoist cylinder 114 is actively lifting the payload bed 112 using fluid directed into the head end 208 (see FIG. 1), fluid being dispelled from the rod end 206 may be routed to the brake cooling circuit 212 to extend the time during which cooling of the brake station 210 can take place. The dispelled fluid may be routed to the brake cooling circuit 212 through passages formed in the hoist valve 204 when it is in the raised position. Post cooling, fluid discharged from the brake cooling circuit 212 may be directed to the tank 218 via a tank line 220.

With continued reference to FIG. 2, the hydraulic system 200 further includes a hydraulic vessel 222 coupled to the hydraulic line 214. The hydraulic vessel 222 may include a movable separator element 224. As shown, the hydraulic vessel 222 has a first end 228, a second end 230, and an inner cavity 232 defined therebetween. The separator element 224 is movably disposed within the inner cavity 232 of the hydraulic vessel 222 and may be sealably engaged with the inner walls 231 of the hydraulic vessel 222. The separator element 224 defines a first fluid chamber 234 that is disposed between the separator element 224 and the first end 228 of the hydraulic vessel 222. The separator element 224 further defines a second fluid chamber 236 that is disposed between the separator element 224 and the second end 230 of the hydraulic vessel 222.

As shown, the hydraulic vessel 222 has a longitudinal axis A-A'. The separator element 224 is configured to travel along the longitudinal axis A-A' of the hydraulic vessel 222. During operation, the hydraulic vessel 222 is positioned such that its longitudinal axis A-A' is at an angle of at least about 5 degrees to about 175 degrees with respect to a horizontal H. For example, in the illustrated embodiment of FIG. 2, the hydraulic vessel 222 is kept substantially upright with respect to the horizontal H i.e., vertically disposed with respect to the horizontal or disposed at about 90 degrees with respect to the horizontal H. In another application, the hydraulic vessel 222 may be kept such that its longitudinal axis A-A' is inclined at an angle of 55 degrees with respect to the horizontal H. However, these angles are merely exemplary in nature and hence, non-limiting of this disclosure. A person having ordinary skill in the art will appreciate that any angle or orientation of the hydraulic vessel 222 may be implemented so long as the second end 230 of the hydraulic vessel 222 is located at a height above the first end 228 of the hydraulic vessel 222.

The first fluid from the hydraulic line 214 of the hydraulic system 200 is receivable in the first fluid chamber 234 of the hydraulic vessel 222 while the second fluid remains disposed within the second fluid chamber 236 of the hydraulic vessel 222. Moreover, the separator element 224 is moveable within the inner cavity 232 of the vessel i.e., between the first and second ends 228, 230 of the hydraulic vessel 222, in response to a volume change of the first fluid received from the hydraulic line 214.

The hydraulic system 200 further includes a relief valve 226 coupled to the hydraulic vessel 222. As shown, the relief valve 226 is disposed in fluid communication with the second fluid chamber 236 of the hydraulic vessel 222. Moreover, the relief valve 226 is disposed between the hydraulic vessel 222 and the atmosphere. In a preferred embodiment as shown in FIG. 2, the second fluid coming out of the relief valve 226 may be beneficially routed to a head space 227 of the tank 218. The relief valve 226 is configured to selectively bleed off a pressure of the second fluid from within the second fluid chamber 236 of the hydraulic vessel 222 in response to a pressure of the first fluid exceeding a pre-determined amount of pressure within the hydraulic vessel 222. As such, the relief valve 226 is also configured to maintain a pre-charge of the second fluid between the relief valve 226 and the hydraulic vessel 222. This pre-charge may be bled-off via the relief valve 226 when the pressure of the first fluid exceeds the pre-determined amount of pressure within the hydraulic vessel 222. Although it is disclosed herein that the relief valve 226 is configured to selectively bleed off a pressure of the second fluid from within the second fluid chamber 236 of the hydraulic vessel 222 when the pressure of the first fluid exceeds the pre-determined amount of pressure within the hydraulic vessel 222, one of ordinary skill in the art will acknowledge that as the pressure of the first fluid within the first fluid chamber 234 increases, a pressure of the second fluid also correspondingly increases between the separator element 224 and the relief valve 226. In various embodiments of the present disclosure, a relief pressure that is typically associated with the relief valve 226 may be set at a certain value depending on the various magnitudes of pressure fluctuations that may occur in the hydraulic line 214. This way, the relief valve 226 can allow the pressure of the second fluid i.e., from the second fluid chamber 236 to increase only until the pressure of the second fluid reaches the relief pressure associated with the relief valve 226. If a pressure of the second fluid exceeds the relief pressure associated with the relief valve 226, the relief valve 226 is configured into an open position to allow a flow of the second fluid from the second fluid chamber 236 to the head space 227 of the tank 218.

Moreover, the relief valve 226 is also configured to supply a charge of second fluid for e.g., air to the second fluid chamber 236 when the pressure from the first fluid falls below the pre-determined amount of pressure within the hydraulic vessel 222. The relief valve 226 can offer protection to the brake cooling circuit 212 should the hydraulic line 214 connecting the first end 228 of the hydraulic vessel 222 experience a pressure spike therein. The relief valve 226 may be configured to limit pressure spikes created in the brake cooling circuit 212 which will be discussed in more detail below. For purposes of the present disclosure, the terms "pressure spike" may refer to a significant increase in the pressure of the first fluid in a relatively short duration of time, usually in the range of milliseconds (ms) to seconds (s).

Figure 3:
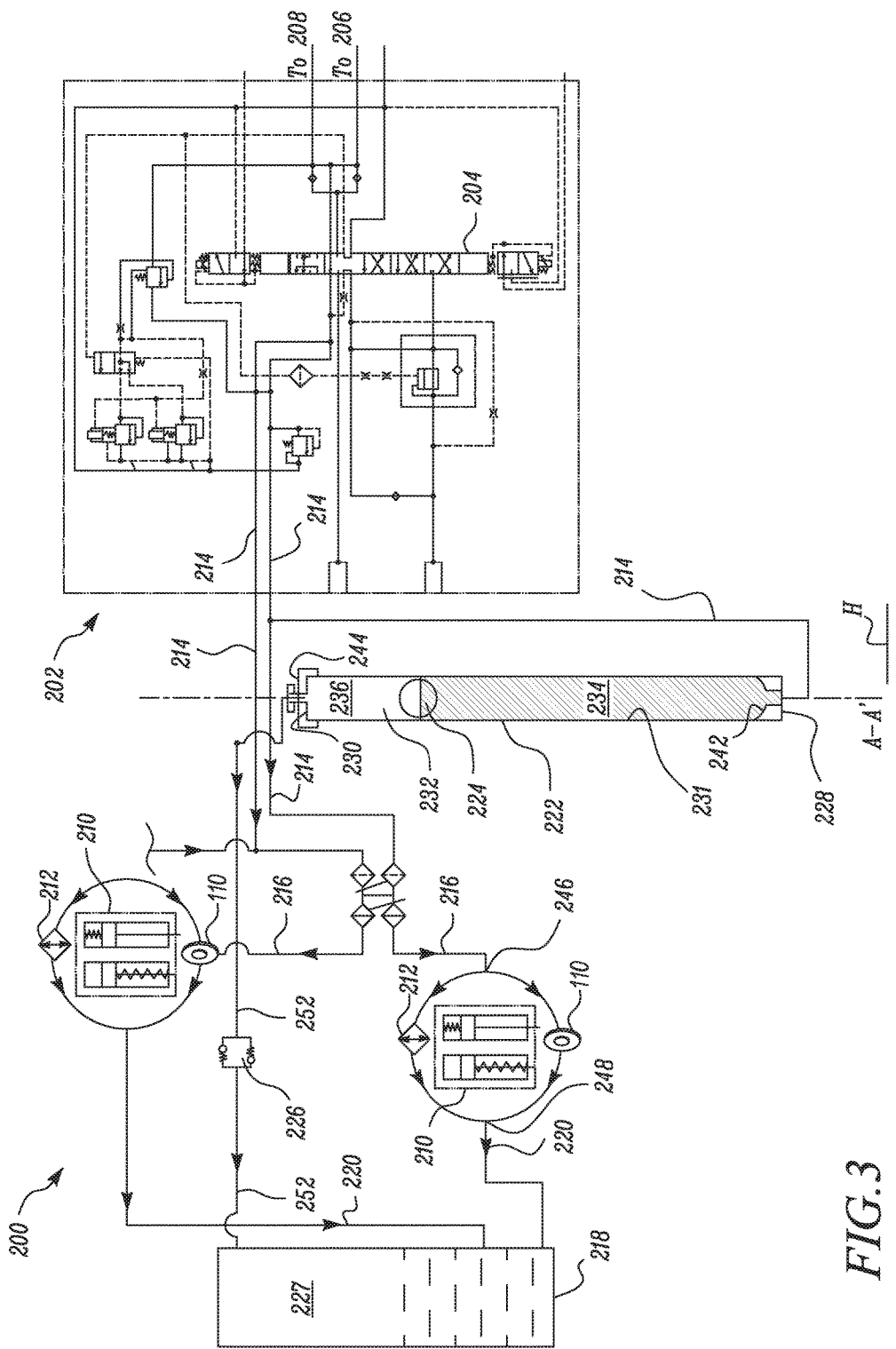
FIGS. 3 and 4 are different operating states of the hydraulic system.
Figure 4:
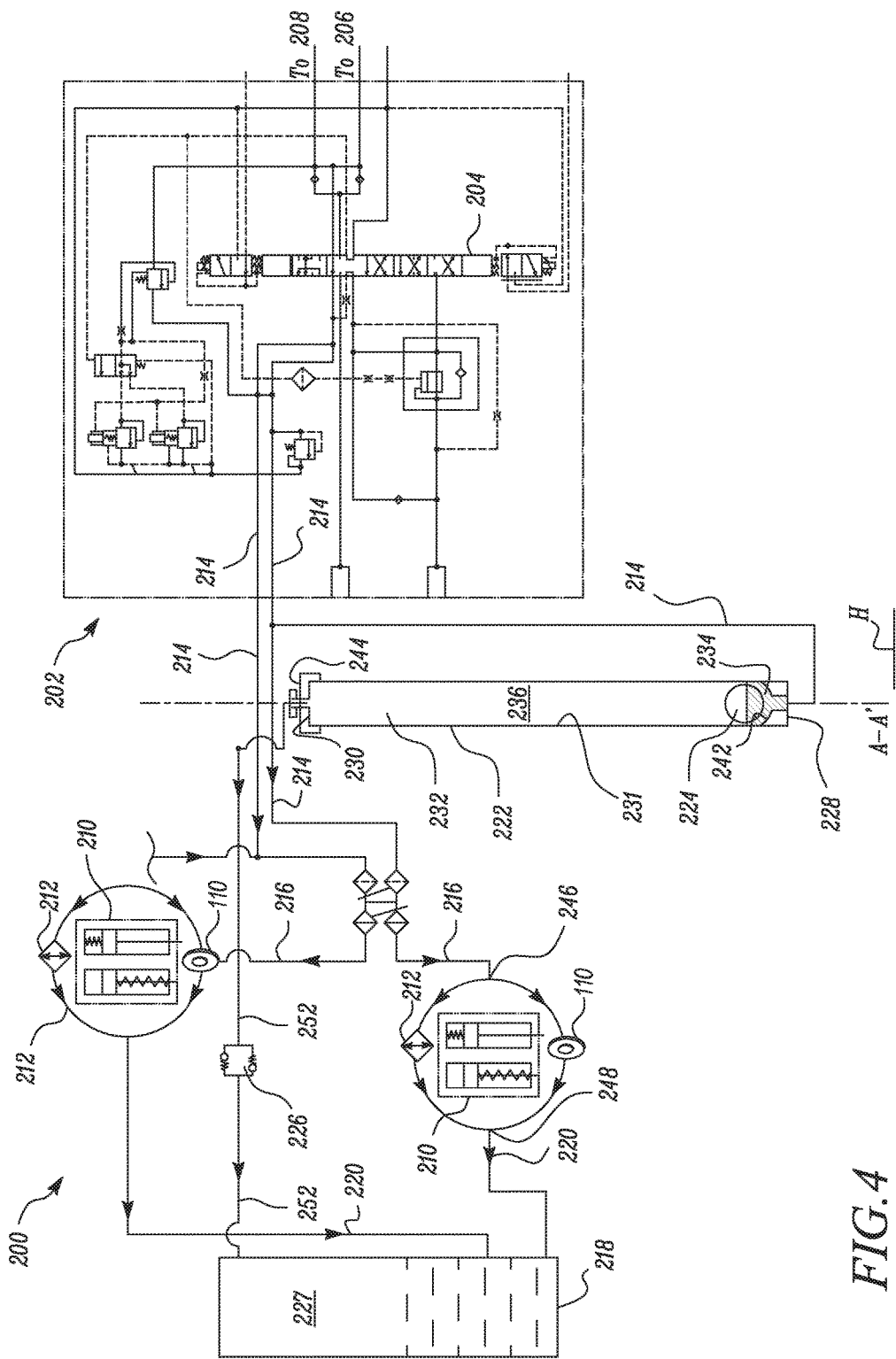

FIGS. 3 and 4 show different operating states of the hydraulic system 200. Referring to FIG. 3, the separator element 224 is shown located at a first operating point in the hydraulic vessel 222 while in FIG. 4; the separator element 224 is shown located at a second operating point that is distinct from the first operating point of the hydraulic vessel 222.

With reference to FIG. 3, the first fluid i.e., oil, from the hoist cylinder 114 may be routed into the hydraulic line 214 for e.g., when the hoist valve 204 is configured to lower the payload bed 112 relative to the frame 104 of the machine 100. In such state of operation of the machine 100, the first fluid that is entering the hydraulic line 214 may be at a significantly high pressure. This high pressure may manifest itself into a pressure spike or a fluid hammer that may cause premature wear or failure of seals that are associated with the brake cooling circuit 212. However, with some portion of the first fluid being directed to the first fluid chamber 234 of the hydraulic vessel 222, a pressure of the first fluid in the brake cooling line 216 and adjacent to the first port 246 is reduced. A volume of second fluid maintained in the second fluid chamber 236 of the hydraulic vessel 222 may then present a certain amount of pressure, say for e.g., about 6 bar to the separator element 224. This pressure of the second fluid maintained between the separator element 224 and the relief valve 226 may be regarded as a back-pressure that allows the separator element 224 to counteract the high pressures of the first fluid in the hydraulic line 214. Therefore, the back-pressure i.e., pressure from pre-charge of the second fluid maintained between the separator element 224 and the relief valve 226 can beneficially reduce or limit the magnitude of pressure spike in the first fluid when an increase in the pressure of the second fluid, brought about by an increase in the pressure of the first fluid, exceeds the relief pressure associated with the relief valve 226. The reduction or limiting of the pressure spike in the first fluid may continue until the separator element 224, biased by the first fluid, reaches the second end 230 of the hydraulic vessel 222. In this manner, the pre-charge of the second fluid maintained between the separator element 224 and the relief valve 226 can allow dampening of pressure spikes in the first fluid.

Therefore, if the pressure spike in the first fluid of the hydraulic system 200 is sufficient to overcome the back-pressure of the second fluid on the separator element 224, then the separator element 224 may be biased by the first fluid to move towards the second end 230 of the hydraulic vessel 222. With regards to the present disclosure, when the separator element 224 moves towards the second end 230 of the hydraulic vessel 222, then the separator element 224 may be regarded as being in the first operating state as shown specifically in FIG. 3.

With reference to FIG. 4, the first fluid i.e., oil, from the hydraulic line 214 may be routed via the hoist valve 204 into the hoist cylinder 114 for e.g., when the hoist valve 204 is configured to raise the payload bed 112 relative to the frame 104 of the machine 100. The hoist valve 204 may be configured into a suitable position for facilitating the flow of the first fluid from the brake cooling line 216 to the hoist cylinder 114. At this point, there may be a drop in volume and/or pressure of the first fluid that is entering the hoist valve 204 and subsequently the hoist cylinder 114. In an embodiment of the present disclosure, the relief valve 226 is configured to supply a charge of the second fluid to the hydraulic vessel 222 in response to pressure from the first fluid falling below the pre-determined amount of pressure within the hydraulic vessel 222. Therefore, during such drop in pressure and/or volume of the first fluid in the hydraulic line 214, the relief valve 226 may allow a charge of the second fluid therethrough so that the second fluid (over and above the pre-charge) may fill up the second fluid chamber 236 of the hydraulic vessel 222. As, the pressure of the second fluid in the second fluid chamber 236 of the hydraulic vessel 222 increases, the pressure of the second fluid would be sufficient to overcome the pressure of the first fluid in the first fluid chamber 234 and bias the separator element 224 towards the first end 228 of the hydraulic vessel 222. This movement of the separator element 224 towards the first end 228 of the hydraulic vessel 222 may beneficially increase the pressure of the first fluid in the hydraulic line 214 and also increase the volume of the first fluid in the hydraulic line 214 when supplying the required volume of the first fluid from the hydraulic line 214 to the hoist cylinder 114 via the hoist valve 204.

In an embodiment of the present disclosure, a seat 242 may be defined at the first end 228 of the hydraulic vessel 222. This seat 242 may be shaped to form a sealable engagement with the separator element 224. Therefore, as the separator element 224 moves towards the first end 228 of the hydraulic vessel 222, the separator element 224 may sealingly engage with the seat 242. Moreover, when the separator element 224 sealingly engages with the seat 242, the second fluid for e.g., air is prevented from escaping past the separator element 224 i.e., between the separator element 224 and walls 231 of the hydraulic vessel 222 and becoming entrained in the first fluid for e.g., oil. This way, the compressibility of the first fluid may not be altered or compromised, and the pump and the hoist cylinder 114 of the machine 100 can operate smoothly in conjunction with a generally incompressible first fluid.

Therefore, if the pressure of the second fluid is sufficient to overcome the pressure of the first fluid in the hydraulic vessel 222, the second fluid biases the separator element 224 towards the first end 228. With regards to the present disclosure, when the separator element 224 moves towards the first end 228 of the hydraulic vessel 222, the separator element 224 may be regarded as being in the second operating state as shown specifically in FIG. 4. Although, the separator element 224 is disclosed herein as being in the first operating state and the second operating state, the positions of the separator element 224 that correspond to the first operating state and the second operating state may vary from one application to another. Therefore, it may be noted that the first operating state and the second operating state disclosed herein are merely exemplary in nature and hence, non-limiting of this disclosure. One of ordinary skill in the art will acknowledge that the separator element 224 may assume any number of positions in the hydraulic vessel 222 depending on the relative pressures of the first and second fluids in the hydraulic vessel 222.

In various embodiments of the present disclosure, the hydraulic system 200 disclosed herein may additionally include a breather element 244 as shown in FIGS. 2-4. The breather element 244 may be coupled between the second end 230 of the hydraulic vessel 222 and the relief valve 226. Moreover, the breather element 244 may be configured with a pressure limit value for the second fluid. This pressure limit value may correspond to the pre-determined amount of pressure within the hydraulic vessel 222. In this embodiment, the breather element 244 may be configured to assist the relief valve 226 in restricting an egress of the second fluid from the second fluid chamber 236 of the hydraulic vessel 222. As such, in various embodiments of the present disclosure, the breather element 244 may be tuneable in nature i.e., the breather element may be provided with a spring and/or other components wherein a tension of the spring and/or the other components may be adjustable to vary the pre-determined amount of pressure that is to be maintained in the hydraulic vessel 222 before any second fluid exits the hydraulic vessel 222.

Figure 5:
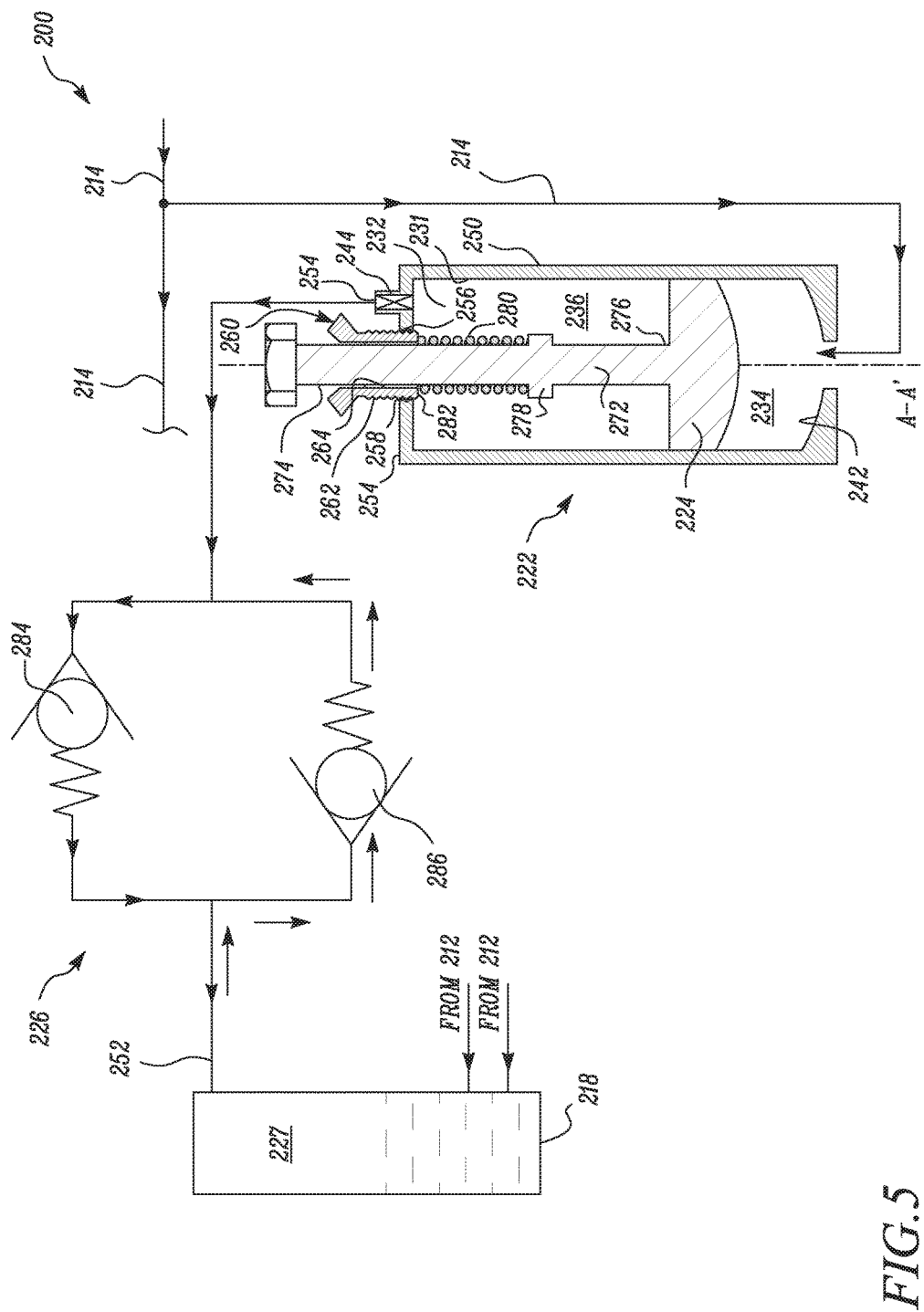
FIG. 5 is a diagrammatic view of the hydraulic system showing the hydraulic vessel, the breather element, and the relief valve, in accordance with an embodiment of the present disclosure.

Referring to FIG. 5, a diagrammatic view of the hydraulic system 200 showing the hydraulic vessel 222, the breather element 244, and the relief valve 226, in accordance with an embodiment of the present disclosure is illustrated. As shown, the hydraulic vessel 222 includes a body 250 having walls 231 that define the inner cavity 232 therein. The first end 228 of the hydraulic vessel 222 is configured to couple to the hydraulic line 214, for e.g., embodying a hose coupling. The seat 242, located in proximity of the first end 228, may be tapered or conically formed to accomplish a sealable engagement with the separator element 224. The second end 230 is configured to couple to a line 252 that connects with the atmosphere or the head space 227 of the tank 218, as shown in FIG. 2.

Figure 6:
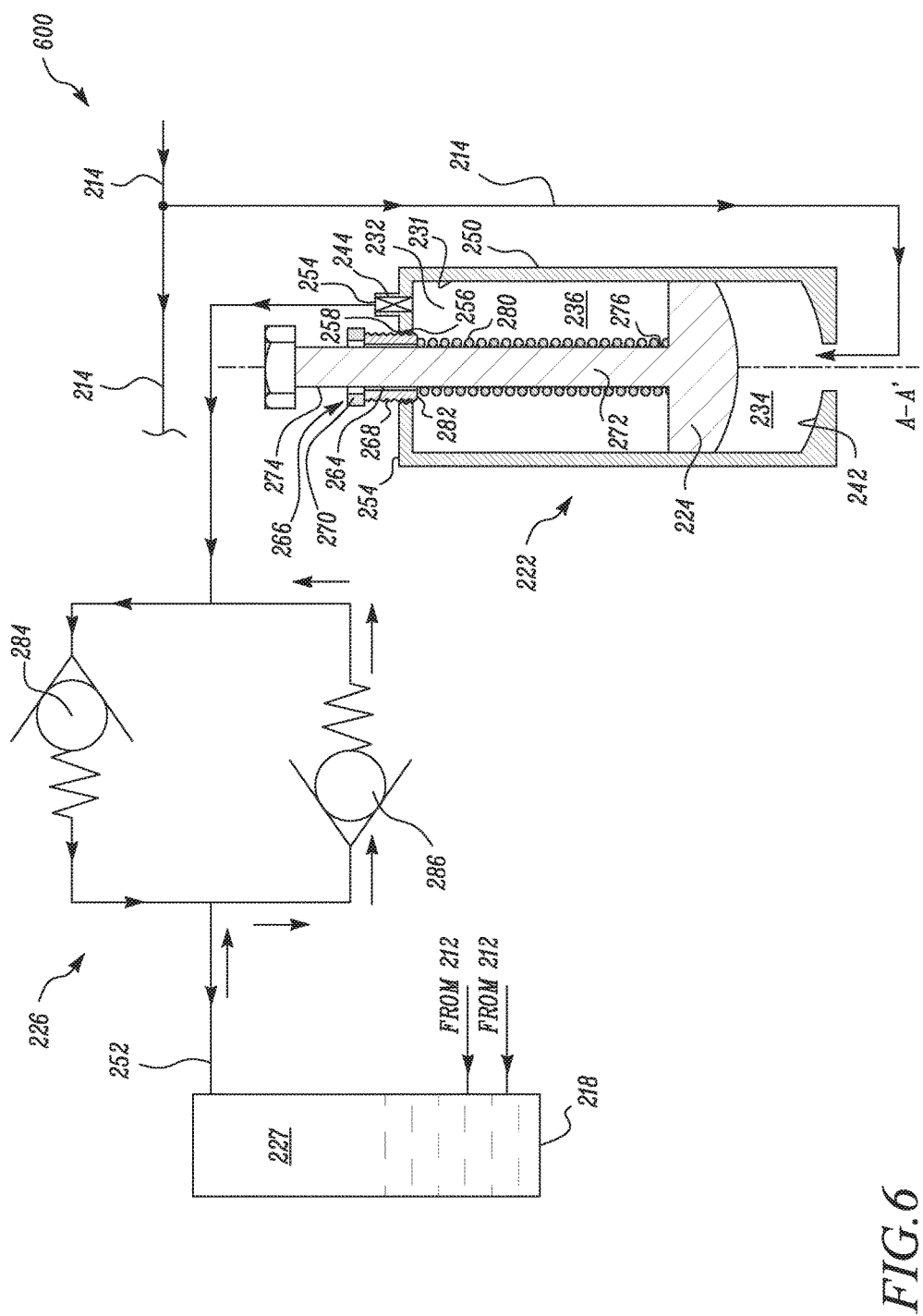
FIG. 6 is a diagrammatic view of the hydraulic system showing the relief valve, in accordance with another embodiment of the present disclosure.
Figure 7:
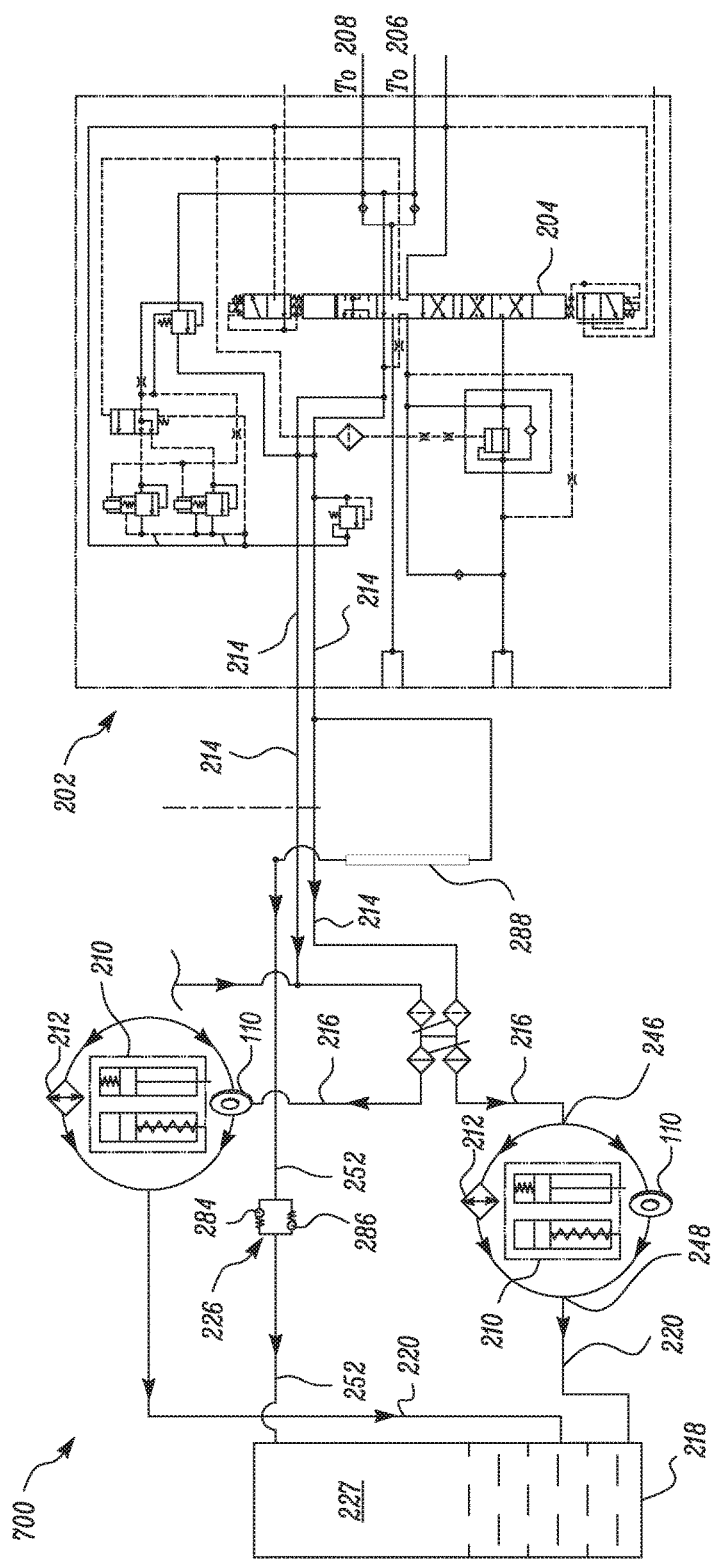
FIG. 7 is a diagrammatic view of the hydraulic system showing a conduit, in accordance with another embodiment of the present disclosure.

In various embodiments of the present disclosure, it may be contemplated to form the hydraulic vessel 222 from any material and in any shape that is convenient for installation. However, the shape of the hydraulic vessel 222 may be any shape including regular and irregular shapes so long as the second end 230 of the hydraulic vessel 222 is disposed at a height above the first end 228 of the hydraulic vessel 222. Moreover, the shape and construction of the hydraulic vessel 222 may be beneficially selected to withstand at least roughly 4 times the pressure from maximum pre-charge of the second fluid maintained between the separator element 224 and the relief valve 226 (See FIGS. 2 and 5). This way, the hydraulic vessel 222 may be rendered with a robust construction to counteract the high pressures encountered during pressure spikes in the hydraulic line 214. For example, in an application as shown in FIG. 7, a conduit 288, for e.g., embodying a length of high-pressure hose, a hard tube, or a small hydraulic tank may be used in place of the hydraulic vessel 222 of FIGS. 2-6. Therefore, it will be appreciated that the hydraulic vessel 222 of the present disclosure can be modified depending on specific requirements of an application and suitably configured to withstand the high pressures encountered during pressure spikes from the first fluid in the hydraulic line 214.

Moreover, in the illustrated embodiment of FIG. 5, a top wall 254 of the hydraulic vessel 222 defines an orifice 256 that is surrounded by internal screw threads 258. The hydraulic vessel 222 is provided with a wing nut 260 having external screw threads 262 and an internal bore 264 defined therethrough. The wing nut 260 is at least partly disposed in the orifice 256 and threadably engaged to the top wall 254 of the body 250 vis-à-vis the external screw threads 262 and the internal screw threads 258. Although a wing nut 260 is disclosed herein, it will be appreciated by one skilled in the art that other suitable structures may be optionally contemplated and used in place of the wing nut 260 of the present disclosure. For example, as shown in FIG. 6, a collar 266 defining a threaded bottom portion 268 and a hexagonal upper portion 270 on its outer surface 272 may be optionally used in lieu of the wing nut 260 of FIG. 5. Therefore, it may be noted that the wing nut 260 disclosed herein is merely exemplary in nature and hence, non-limiting of this disclosure.

Turning back to FIG. 5, the hydraulic vessel 222 is further provided with a plunger 272 slidably received within the internal bore 264 of the wing nut 260. The plunger 272 may include a first end 274 that is disposed away from the body 250 of the hydraulic vessel 222 and a second end 276 that is coupled to the separator element 224. As such, the second end 276 of the plunger 272 together with the separator element 224 is disposed within the hydraulic vessel 222. As shown, the plunger 272 may additionally have a stop element 278 disposed partway along its length. Further, the plunger 272 may be provided with a spring 280 that is disposed between a bottom side 282 of the wing nut 260 and the stop element 278. A tension of the spring 280 can be adjusted by rotating the collar 266 i.e., clockwise or counter-clockwise about the longitudinal axis A-A'. Adjustment to the tension of the spring 280 may allow the flowrate of the second fluid through the breather element 244 to be varied when the first fluid exceeds the pre-determined amount of pressure in the hydraulic vessel 222. Therefore, as the first fluid from the hydraulic line 214 enters the hydraulic vessel 222, the spring-loaded plunger 272 can allow damping of pressure fluctuations in the first fluid until the spring 280 is subjected to maximum compression between the wing nut 260 and the stop element 278.

Optionally, in an embodiment as shown in FIG. 6, the stop element 278 (shown in FIG. 5) may altogether be omitted from the hydraulic system 200, and the spring 280 may be configured to extend between the wing nut 260 and the separator element 224. However, a general working principle of the hydraulic system 600 may be considered similar to that of the hydraulic system 200 from FIG. 5.

Moreover, as shown in the embodiments of FIGS. 5 and 6, the relief valve 226 is configured to include a first spring-loaded check valve 284 and a second spring-loaded check valve 286 that are disposed in parallel and in a mutually opposing relation to one another. Although the relief valve 226 is configured to include the first and second spring-loaded check valves 284, 286 therein, it will be appreciated by persons skilled in the art that alternate configurations of the relief valve may be contemplated and such alternate configurations may be suitably implemented in the hydraulic system 200/600 for accomplishing functions consistent with the present disclosure.

The first check valve 284 is configured to allow a flow of the second fluid from the second fluid chamber 236 to the head space 227 of the tank 218 when a pressure of the first fluid i.e., from the hydraulic line 214 and the first fluid chamber 234 exceeds the back-pressure offered by the second fluid maintained between the first check valve 284 and the second check valve 286, and the separator element 224. As such, when the pressure of the first fluid in the first fluid chamber 234 exceeds the back-pressure offered by the second fluid, the pressure of the first fluid biases the separator element 224 towards the second end 230 of the hydraulic vessel 222 thereby causing an increase in the pressure of the second fluid as well.

The second check valve 286 is configured to allow a flow of the second fluid from the head space 227 of the tank 218 to the second fluid chamber 236 when a pressure of the first fluid in the first fluid chamber 234 falls below the pre-determined amount of pressure within the hydraulic vessel 222 and is inadequate to resist the back-pressure offered by the second fluid maintained between the first check valve 284 and the separator element 224. As such, when the pressure of the first fluid in the first fluid chamber 234 is inadequate to resist the back-pressure offered by the second fluid, the pressure from the pre-charge of the second fluid biases the separator element 224 towards the first end 228 of the hydraulic vessel 222. This may cause an increase in the pressure and flowrate of the first fluid as the first fluid is being drawn out from the first fluid chamber 234 into the hydraulic line 214.

In embodiments of the present disclosure, the first and second spring-loaded check valves 284, 286 may be additionally configured to open at different pressure values associated with the second fluid. In a preferred embodiment, the first check valve 284 may be configured to open at high pressure values of the second fluid while the second check valve 286 may be configured to open at low pressure values of the second fluid. The first check valve 284 may be configured to open at for e.g., 90 kPa with 0-3 kPa of makeup pressure while the second check valve 286 may be configured to open at for e.g., 70 kPa with 0-3 kPa of makeup pressure. In this manner, when the first fluid from the hydraulic line 214 undergoes pressure spikes, the first check valve 284 can accomplish a rapid damping of the pressure fluctuations in the first fluid by routing the second fluid to the head space 227 only when the second fluid exceeds the high pressure value set at the first check valve 284, for e.g., at 90 kPa, while the second check valve 286 can assist in the quick entry of the second fluid from the head space 227 of the tank 218 to the second fluid chamber 236 of the hydraulic vessel 222 when a pressure of the first fluid in the first fluid chamber 234 falls below the pre-determined amount of pressure in the hydraulic vessel 222 i.e., only when the second fluid exceeds the low pressure value set at the second check valve 286, for e.g., at 70 kPa.

Optionally, in another embodiment as shown in FIG. 7, the hydraulic vessel 222 and the second fluid therein (shown in FIG. 5) may altogether be omitted from the hydraulic system 700. Instead, a conduit 288 for e.g., a hard hose or tubing of sufficient volume to absorb pressure fluctuations of the first fluid may be used in lieu of the hydraulic vessel 222. However, as the conduit 288 does not include a separator element, a shape of the conduit 288 may be selected such that the conduit 288 is capable of preventing aeration i.e., the second fluid becoming entrained in the first fluid when the second fluid used in the hydraulic system 700 is air, and/or any turbulence in the flow of the first fluid when the first fluid enters the conduit 288. This way, the compressibility of the first fluid may not be altered or compromised as the conduit 288 can prevent an intermixing of the first and second fluids. Moreover, the pump and the hoist cylinder 114 of the machine 100 can operate smoothly in conjunction with a generally incompressible first fluid. Furthermore, this configuration of the hydraulic system 700 can allow the first and second check valves 284, 286 to independently operate depending on the pressure of the first fluid and the pressure values set at the first and second check valves 284, 286 respectively.

Figure 8:
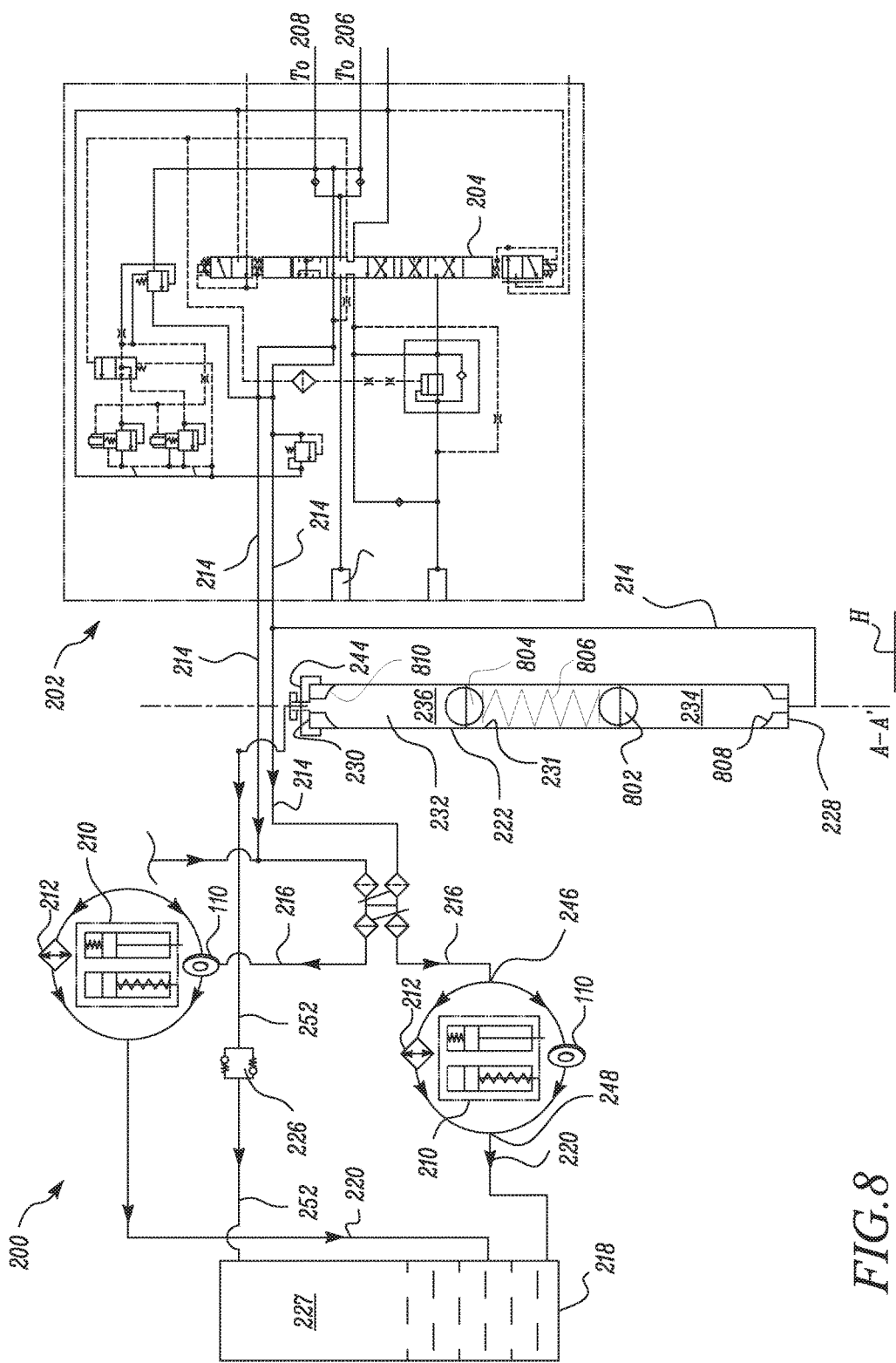
FIG. 8 is a diagrammatic view of the hydraulic system showing a separator element, in accordance with another embodiment of the present disclosure.

FIG. 8 illustrates another embodiment of the hydraulic system 800 in which the separator element 224 is configured to include a first float element 802, a second float element 804, and a connecting element 806. The first float element 802 is disposed proximal to the first end 228 of the hydraulic vessel 222 and configured to define the first fluid chamber 234 with the first end 228 of the hydraulic vessel 222. The second float element 804 is spaced apart from the first float element 802 and disposed proximal to the second end 230 of the hydraulic vessel 222. The second float element 804 is configured to define the second fluid chamber 236 with the second end 230 of the hydraulic vessel 222. The connecting element 806 is configured to couple the first float element 802 to the second float element 806. In the illustrated embodiment of FIG. 8, the connecting element 806 is embodied in the form of a spring that resiliently connects the first float element 802 to the second float element 804. This way, the spring 806 can dampen pressure fluctuations of the first fluid occurring in first fluid chamber 234 and the hydraulic line 214. Moreover, with the configuration of the first and second float elements 802, 804 disclosed herein; the hydraulic vessel 222 can be formed into any shape and configured to include two seat portions 808, 810 corresponding to the first float element 802 and the second float element 804. When the pressure of the first fluid is higher than the pre-determined amount of pressure within the hydraulic vessel 222, the first float element 802 may be biased towards the second float element 804 and may hence, compress the connecting element 806. Thereafter, the first float element 802 and the second float element 804 may move towards the seat portion 810 to allow the second float element 804 to sealingly engage with the seat portion 810. This engagement may prevent the second fluid from becoming entrained in the first fluid. Similarly, when the pressure of the first fluid falls below the pre-determined amount of pressure within the hydraulic vessel 222, the second float element 804 may be biased towards the first float element 802 and may hence, compress the connecting element 806. Thereafter, the first float element 802 and the second float element 804 may move towards the seat portion 808 to allow the first float element 802 to sealingly engage with the seat portion 808. This engagement may prevent the second fluid from becoming entrained in the first fluid.

Although various embodiments of the present disclosure have been explained in conjunction with the machine 100 that includes a hoist cylinder 114 and a brake station 210 (See FIGS. 1 and 2), it will be appreciated by one of ordinary skill in the art that the hydraulic system 200 disclosed herein may be suitably implemented in various other types of machines and/or stand-alone fluid systems, hydraulic, pneumatic, or both; where pressure spikes are typically known to occur and stabilization of such pressure spikes is desired.

Various embodiments disclosed herein are to be taken in the illustrative and explanatory sense, and should in no way be construed as limiting of the present disclosure. All joinder references e.g., attached, affixed, coupled, engaged, connected, and the like are only used to aid the reader's understanding of the present disclosure, and may not create limitations, particularly as to the position, orientation, or use of the systems, processes, and/or methods disclosed herein. Therefore, joinder references, if any, are to be construed broadly. Moreover, such joinder references do not necessarily infer that two elements are directly connected to each other. Moreover, expressions such as "including", "comprising", "incorporating", "consisting of", "containing", "having", and the like, used to describe and claim the present disclosure, are intended to be construed in a non-exclusive manner, namely allowing for components or elements not explicitly described also to be present.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in fluid systems in which pressure spikes of a working fluid are typically encountered and such pressure spikes need to be limited or reduced in order to prevent pressure sensitive components of the fluid systems from undergoing undue wear and tear or premature failure.

As disclosed earlier herein, the separator element 224 is configured to travel within the inner cavity 232 of the hydraulic vessel 222. Moreover, the hydraulic vessel 222 is kept in an orientation wherein the second end 230 of the hydraulic vessel 222 is located above the first end 228 of the hydraulic vessel 222. This configuration of the hydraulic vessel 222 and the separator element 224 allows the second fluid to counterbalance and regulate the pressure of the first fluid in the hydraulic line 214 when the first fluid from the hoist cylinder 114 enters the hydraulic line 214 via the hoist valve 204.

In the event of a pressure spike, the relief valve 226 may be further configured to open and allow the second fluid to escape the hydraulic vessel 222 while the second fluid continues to offer some resistance to the pressure of the first fluid. This way, pressure spikes from the first fluid in the hydraulic line 214 may be dampened to an acceptable level at which pressure sensitive components for e.g., seals located at the brake stations 210 of the machine 100 are able to function smoothly and without damage thereto. Therefore, the relief valve 226 and the hydraulic vessel 222 disclosed herein may together mitigate any detrimental effects arising from pressure spikes to the service life and functioning of various types of pressure sensitive components in a fluid system. Thus, the system 200 of the present disclosure can offer a simple yet effective solution aimed at reducing or limiting pressure spikes from working fluids, and preventing undue wear and tear, or premature failure of pressure sensitive components in a given fluid system.

Moreover, as the relief valve 226 is configured to supply a charge of the second fluid into the second fluid chamber 236 of the hydraulic vessel 222 when the pressure of the first fluid in the first fluid chamber 234 of the hydraulic vessel 222 falls below the pre-determined amount of pressure, the relief valve 226 assists in maintaining the pre-determined amount of pressure required in the hydraulic line 214 when the first fluid is entering the hoist valve 204 for operating the hoist cylinder 114.

While aspects of the present disclosure have been particularly shown and described with reference to the embodiments above, it will be understood that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A system for stabilizing pressure fluctuations in a hydraulic line of a hydraulic circuit, the system comprising:
   a hydraulic vessel coupled to the hydraulic line, the hydraulic vessel having a first end, a second end, and an inner cavity defined therebetween, a movable separator element disposed within the inner cavity of the hydraulic vessel, the separator element defining a first fluid chamber disposed between the separator element and the first end and a second fluid chamber disposed between the separator element and the second end;
   the hydraulic vessel comprising a first fluid receivable in the first fluid chamber from the hydraulic line that is disposed proximal to the first end and a second fluid disposed within the second fluid chamber proximal to the second end, wherein the separator element is moveable within the inner cavity of the vessel between the first and second ends in response to a volume change of the first fluid;
   a relief valve disposed in fluid communication with the second fluid chamber of the hydraulic vessel, the relief valve configured to:
   selectively release a pressure of second fluid from the second fluid chamber of the vessel in response to a pressure of the first fluid exceeding a pre-determined amount of pressure within the hydraulic vessel; and
   selectively permit a charge of the second fluid to enter the second fluid chamber of the hydraulic vessel in response to a pressure of the first fluid falling below the pre-determined amount of pressure within the hydraulic vessel, and
   a breather element coupled between the second end of the hydraulic vessel and the relief valve, the breather element configured with a pressure limit value for the second fluid, the pressure limit value corresponding to the pre-determined amount of pressure within the hydraulic vessel.

2. The system of claim 1, wherein the separator element is configured to move to a first operating point in the hydraulic vessel in response to the first fluid flowing from the hydraulic line into the hydraulic vessel.

3. The system of claim 2, wherein the separator element is configured to move to a second operating point in the hydraulic vessel in response to the first fluid flowing from the hydraulic vessel into the hydraulic line, the second operating point being distinct from the first operating point and located proximal to the first end of the hydraulic vessel.

4. The system of claim 1, wherein the hydraulic vessel is disposed upright with respect to a horizontal.

5. The system of claim 1, wherein the separator element is configured to travel along a longitudinal axis of the hydraulic vessel.

6. The system of claim 1 further comprising a seat defined at the first end of the hydraulic vessel, the seat shaped to form a sealable engagement with the separator element.

7. The system of claim 1, wherein the separator element includes:
   a first float element disposed proximal to the first end of the hydraulic vessel and configured to define the first fluid chamber with the first end of the hydraulic vessel;
   a second float element disposed proximal to the second end of the hydraulic vessel and in a spaced apart relation to the first float element, the second float element configured to define the second fluid chamber with the second end of the hydraulic vessel; and
   a connecting element coupling the first float element to the second float element.

8. The system of claim 7, wherein the connecting element is a spring.

9. A hydraulic system for stabilizing pressure fluctuations in a hydraulic line of a machine, the system comprising:
   a hydraulic subsystem having a variable pressure to perform a hydraulic function, the hydraulic subsystem including a port; a hydraulic line coupled to the port;
   a hydraulic vessel coupled to the hydraulic line, the hydraulic vessel having a first end, a second end, and an inner cavity defined therebetween, a movable separator element disposed within the inner cavity of the hydraulic vessel, the separator element defining a first fluid chamber disposed between the separator element and the first end and a second fluid chamber disposed between the separator element and the second end;
   the hydraulic vessel comprising a first fluid receivable in the first fluid chamber from the hydraulic line that is disposed proximal to the first end and a second fluid disposed within the second fluid chamber proximal to the second end, wherein the separator element is moveable within the inner cavity of the vessel between the first and second ends in response to a volume change of the first fluid;
   a relief valve disposed in fluid communication with the second fluid chamber of the hydraulic vessel, the relief valve configured to: selectively release a pressure of second fluid from the second fluid chamber of the vessel in response to a pressure of the first fluid exceeding a pre-determined amount of pressure within the hydraulic vessel; and selectively permit a charge of the second fluid to enter the second fluid chamber of the hydraulic vessel in response to a pressure of the first fluid falling below the pre-determined amount of pressure within the hydraulic vessel, and
   a breather element coupled between the second end of the hydraulic vessel and the relief valve, the breather element configured with a pressure limit value for the second fluid, the pressure limit value corresponding to the pre-determined amount of pressure within the hydraulic vessel.

10. The hydraulic system of claim 9, wherein the separator element is configured to move to a first operating point in the hydraulic vessel in response to the first fluid flowing from the hydraulic line into the hydraulic vessel.

11. The hydraulic system of claim 10, wherein the separator element moves to a second operating point in the hydraulic vessel in response to the first fluid flowing from the hydraulic vessel into the hydraulic line, the second operating point being distinct from the first operating point.

12. The hydraulic system of claim 9, wherein the hydraulic vessel is disposed upright with respect to a horizontal.

13. The hydraulic system of claim 9 further comprising a seat defined at the first end of the hydraulic vessel, the seat shaped to form a sealable engagement with the separator element.

14. The hydraulic system of claim 9, wherein the hydraulic subsystem is a cooling circuit associated with a brake station of a wheel hub.

15. The hydraulic system of claim 14, wherein the relief valve is configured with a first check valve to open at high pressure of the second fluid and with a second check valve configured to supply the second fluid in a low-pressure state to the hydraulic vessel.

16. A machine comprising: a hoist cylinder;
a hoist control valve system coupled to the hoist cylinder, the hoist control valve system configured to selectively actuate movement of the hoist cylinder;
a wheel hub;
a brake station positioned at the wheel hub;
a brake cooling circuit coupled to the brake station;
a hydraulic line coupled between a rod end of the hoist cylinder via the hoist control valve system and the brake cooling circuit when the hoist control valve system is in a raise position;
a hydraulic vessel coupled to the hydraulic line, the hydraulic vessel having a first end, a second end, and an inner cavity defined therebetween, a movable separator element disposed within the inner cavity of the hydraulic vessel, the separator element defining a first fluid chamber disposed between the separator element and the first end and a second fluid chamber disposed between the separator element and the second end;
the hydraulic vessel comprising a first fluid receivable in the first fluid chamber from the hydraulic line that is disposed proximal to the first end and a second fluid disposed within the second fluid chamber proximal to the second end, wherein the separator element is moveable within the inner cavity of the vessel between the first and second ends in response to a volume change of the first fluid received from the hydraulic line; and
a relief valve disposed in fluid communication with the second fluid chamber of the hydraulic vessel, the relief valve configured to selectively bleed off a pressure of the second fluid within the second fluid chamber of the vessel in response to a pressure of the first fluid exceeding a pre-determined amount of pressure within the hydraulic vessel.

17. The machine of claim 16, wherein the relief valve is further configured to supply a charge of the second fluid to the hydraulic vessel in response to pressure from the first fluid falling below the pre-determined amount of pressure within the hydraulic vessel.

18. The machine of claim 16 further comprising a breather element coupled between the second end of the hydraulic vessel and the relief valve, the breather element configured with a pressure limit value for the second fluid, the pressure limit value corresponding to the pre-determined amount of pressure within the hydraulic vessel.

* * * * *